(12) United States Patent
Ohgoshi et al.

(10) Patent No.: US 6,541,760 B2
(45) Date of Patent: Apr. 1, 2003

(54) ROTATION DETECTING APPARATUS DETECTING ROTATION OPERATION BY LIGHT TRANSMISSION TO PREVENT INVALID DETECTION

(75) Inventors: Kenji Ohgoshi, Fukushima-ken (JP); Yasuji Hagiwara, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 254 days.

(21) Appl. No.: 09/757,681

(22) Filed: Jan. 9, 2001

(65) Prior Publication Data

US 2001/0008270 A1 Jul. 19, 2001

(30) Foreign Application Priority Data

Jan. 19, 2000 (JP) ......................................... 2000-010553

(51) Int. Cl.[7] ................................................ G01D 5/34
(52) U.S. Cl. ............................ 250/231.13; 250/231.18; 341/6
(58) Field of Search ....................... 250/231.13, 231.14, 250/231.15, 231.18, 231.19; 341/6, 13; 356/150, 151, 614, 615

(56) References Cited

U.S. PATENT DOCUMENTS

| 4,358,753 | A | * | 11/1982 | Cascini ........................... 341/2 |
| 5,841,132 | A | * | 11/1998 | Horton et al. .......... 250/231.13 |
| 6,093,928 | A | * | 7/2000 | Ohtomo et al. ......... 250/231.13 |
| 6,274,864 | B1 | * | 8/2001 | Neckel ................... 250/231.13 |

FOREIGN PATENT DOCUMENTS

| JP | 60-3517 | * | 1/1985 |
| JP | Hei 7-32819 | | 4/1995 |

* cited by examiner

*Primary Examiner*—Huy Mai
(74) *Attorney, Agent, or Firm*—Brinks Hofer Gilson & Lione

(57) ABSTRACT

A rotating body has paired anchoring projections and small projections projectingly disposed on one side thereof. On a shutter plate are formed guide holes in which the paired anchoring projections and small projections inserted in the shutter plate are slidable within a predetermined allowance angle range. When rotation input to a handle is broken during rotation input, the shutter plate is rotated respective to the rotating body in a direction opposite to the rotation direction of the rotating body within the allowance angle range, and the light transmission paths are closed by the shutter plate.

6 Claims, 8 Drawing Sheets

ROTATION DETECTING APPARATUS DETECTING ROTATION OPERATION BY LIGHT TRANSMISSION TO PREVENT INVALID DETECTION

BACKGROUND OF THE INVENTION

1. Technical Field of the Invention

The present invention relates to a rotation detecting apparatus that detects rotation operations by light transmission, and more particularly to a rotation detecting apparatus capable of preventing invalid detection.

2. Description of the Prior Art

FIG. 10 is an exploded perspective view showing a conventional optical rotation detecting apparatus 50.

The rotation detecting apparatus 50 is provided with a rotating body 51, a base 52, a handle 53, a sensor 54 as detecting means, and a motor M and a deceleration gear train G as load means.

The rotating body 51 comprises a disk 51a and a shaft projection 51b, which is formed at the central portion of rotation of the disk 51a. The disk 51a has a gear G5 formed in the circumference thereof and the shaft projection 51b has a through hole 51c formed at the center thereof. On the disk 51a are formed plural light transmission paths (slits) 51d penetrating from one side thereof to another side. The light transmission paths 51d all have the same shape and are formed at an equal interval. A base 52 has a support plate 52a on which a support shaft 52b is formed projectingly toward the rotating body 51. A sensor 54 comprises a light emitting part 54a consisting of a light emitting element and a light receiving part 54b consisting of a light receiving element.

In the above-described rotation detecting apparatus 50, the shaft projection 51b is inserted in the support shaft 52b of the base 52 and the rotating body 51 is supported on the base 52 so that it can rotate freely. The shaft projection 51b is provided with a handle 53 which is rotated integrally with the rotating body 51. The rotating body 51 is provided with the sensor 54 with the light emitting part 54a at one side of the light transmission paths 51d and the light receiving part 54b at another side. One end of the deceleration gear train G is connected to the motor M and the other is connected to the gear G5 of the rotating body 51.

The above-described rotation detecting apparatus 50 can be used as, e.g., a fishing game controller, which is designed so that a fishline can be simulatively wound when the handle 53 is rotated unidirectionally (forward rotation). Also, rotation resistance is applied to the handle 53 when a coil of the motor M is short-circuited during rotation of the handle 53.

However, the above-described conventional rotation detecting apparatus 50 has the problem that, when the handle 53 is rotated in a direction opposite to the forward direction, the rotating body 51 is rotated and a rotation signal is detected by the sensor 54.

Accordingly, some of conventional rotation detecting apparatuses are provided with a backward rotation prevention clutch (unidirectional rotation clutch) for preventing the rotating body 51 from rotating when the handle 53 rotates backward. However, although the problem can be prevented that a rotation signal is erroneously detected by the sensor 54 when the handle is rotated backward, there is the problem that, when rotation input in the forward rotation direction by the handle 53 is broken, the rotating body 51 continues to rotate by inertial force produced by the weight of a rotor of the motor M, so that a rotation signal is erroneously detected by the sensor 54 although the handle 53 is stopped.

SUMMARY OF THE INVENTION

The present invention has been made to solve the above-described problems and provides a rotation detecting apparatus capable of preventing a sensor from making invalid detection due to the inertial force of a rotating body when a handle is stopped.

Also, the present invention provides a rotation detecting apparatus that has a type of handle capable of backward rotation and, even when the handle is rotated backward, can ignore input in the backward rotation direction.

The present invention has: a first rotating body; a second rotating body serving as an input side of rotation force that rotates along with the first rotating body; light transmission paths formed on both the first rotating body and the second rotating body; and detecting means for detecting light passing through both the light transmission paths of the first rotating body and those of the second rotating body, wherein the first rotating body and the second rotating body can rotate relatively within a predetermined allowance angle range, wherein, when rotation force is inputted to the second rotating body, and the second rotating body and the first rotating body are rotating together in the rotation input direction, the light transmission paths of the first rotating body and those of the second rotating body overlap one another and light can be detected by the detecting means, and wherein, when input of the rotation force to the second rotating body is broken and the first rotating body continues to rotate by inertia force in the rotation input direction, the second rotating body rotates relative to the first rotating body in a direction opposite to the rotation direction of the first rotating body within the allowance angle range, the light transmission paths of the first rotating body and those of the second rotating body deviate in position from each other, and the light to the detecting means is cut off.

By the above means, even if input to the second rotating body is broken and the first rotating body is rotated by inertia force, since the light transmission paths are immediately closed and light is cut off, invalid detection by the detecting means is prevented. That is, when the first rotating body is rotated by inertia force, the first rotating body and the second rotating body are relatively rotated in the directions that the light transmission paths of the first rotating body and those of the second rotating body do not overlap one another, whereby light issued from a light emitting part is not transmitted to a light receiving part, so that the invalid detection that a rotation signal is outputted despite the break of rotation input is prevented.

In the present invention, preferably, a load to exert the inertia force is connected to the first rotating body.

In the present invention, a motor to apply rotation force to the first rotating body is provided to apply rotation resistance to the first rotating body or rotation force in a direction opposite to the rotation direction of rotation force inputted to the second rotating body. When the motor does not exert the rotation resistance force or the rotation force of the opposite direction, the inertia force is applied to the first rotating body by the weight of a rotor of the motor.

For example, by short-circuiting a coil of the motor, a rotation load can be generated to cause the rotation resistance force to be produced in the motor. Or by energizing the motor in the backward rotation direction, rotation force of opposite direction is applied to the first rotating body. In this case, when the coil of the motor is not short-circuited and is not energized for backward rotation, the rotor of the motor exerts the inertia force.

By the above arrangement, when the rotation detecting apparatus is used as a fishing game controller, loads placed on the hands of an operator who simulatively winds a fishline can be changed so that the game can be expressed more realistically.

The present invention has: a first rotating body; a second rotating body serving as an input side of rotation force that rotates along with the first rotating body; light transmission paths formed on both the first rotating body and the second rotating body; and detecting means for detecting light passing through both the light transmission paths of the first rotating body and those of the second rotating body, wherein the first rotating body and the second rotating body can rotate relatively within a predetermined allowance angle range, wherein, when rotation force is inputted to the second rotating body, and the second rotating body and the first rotating body are rotating together in the rotation input direction, the light transmission paths of the first rotating body and those of the second rotating body overlap one another and light can be detected by the detecting means, and wherein, when rotation force in a direction opposite to the input direction is applied to the second rotating body and the second rotating body rotates relative to the first rotating body in a direction opposite to the rotation direction of the first rotating body within the allowance angle range, the light transmission paths of the first rotating body and those of the second rotating body deviate in position from each other, and the light to the detecting means is cut off.

By the above means, even if a clutch for preventing backward rotation is not provided and the second rotating body may rotate backward, as soon as rotation force of the opposite direction is applied to the second rotating body, the first rotating body and the second rotating body are relatively rotated in the directions that the light transmission paths are closed, so that invalid detection by the detecting means is prevented.

In the present invention, preferably, a handle to apply rotation force to the second rotating body is provided, and when the first rotating body and the second rotating body rotate together and light passing through the light transmission paths is detected by the detecting means, control input to game software is made by a light detection signal from the detecting means that changes in accordance with the rotation speeds of the first rotating body and the second rotating body.

That is, in accordance with the rotation speeds of the first rotating body and the second rotating body, changes of the brightness of light passing through the light transmission paths are detected, and a rotation amount and a rotation speed during handle operations are controlled. By this arrangement, for example, when the rotation detecting apparatus is used as a fishing game controller, the amount of simulative fishline winding can be controlled in accordance with the size of a hit fish.

The present invention, without being limited to a rotation detecting apparatus for a game controller, may be applied to operation switches or the like.

BRIEF DESCRIPTION OF THE DRAWINGS

Preferred embodiments of the present invention will be described in detail based on the followings, wherein.

DESCRIPTION OF THE PREFERRED EMBODIMENTS

Figure 1:
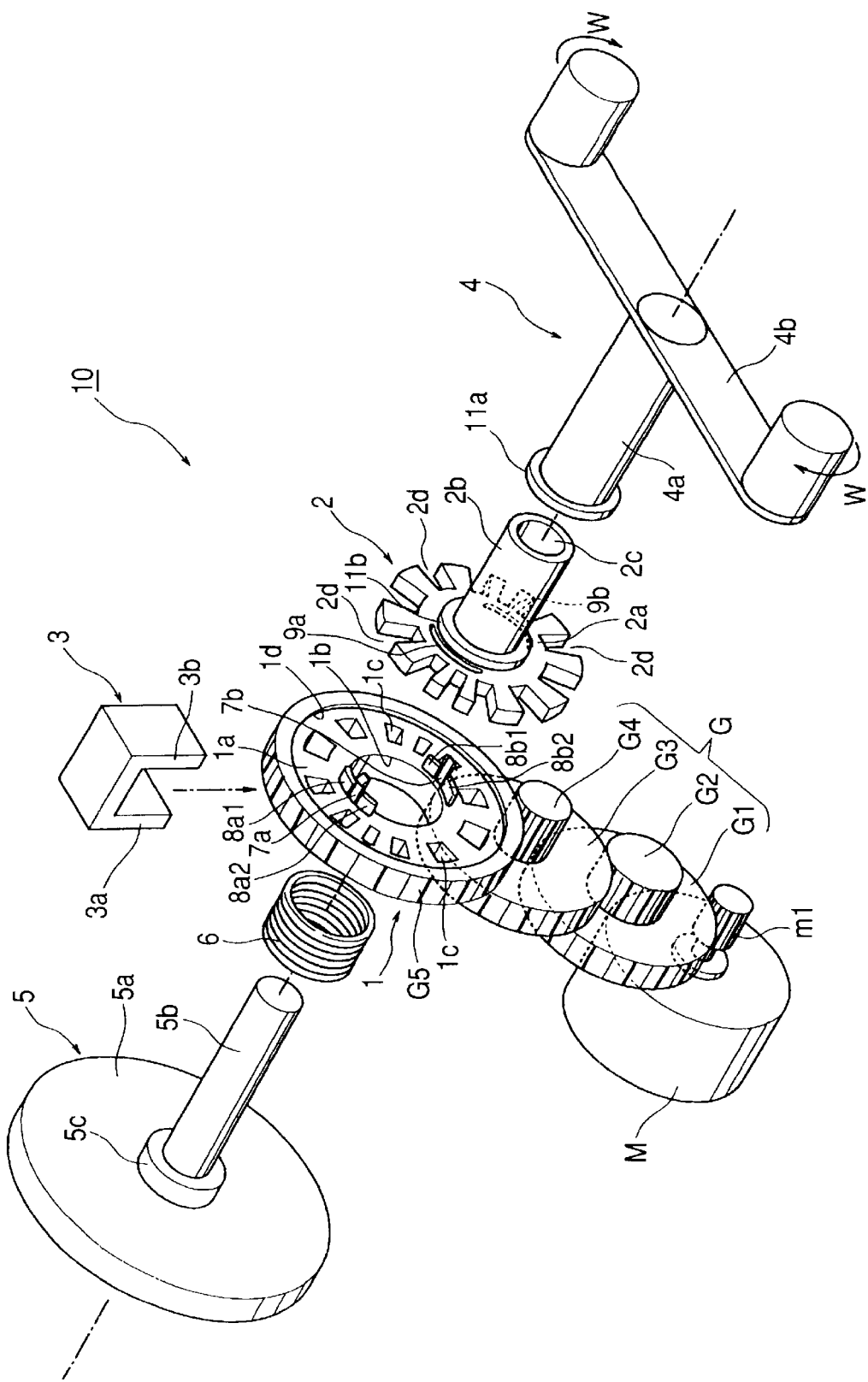
FIG. 1 is an exploded perspective view of a rotation detecting apparatus of the present invention.
Figure 2:
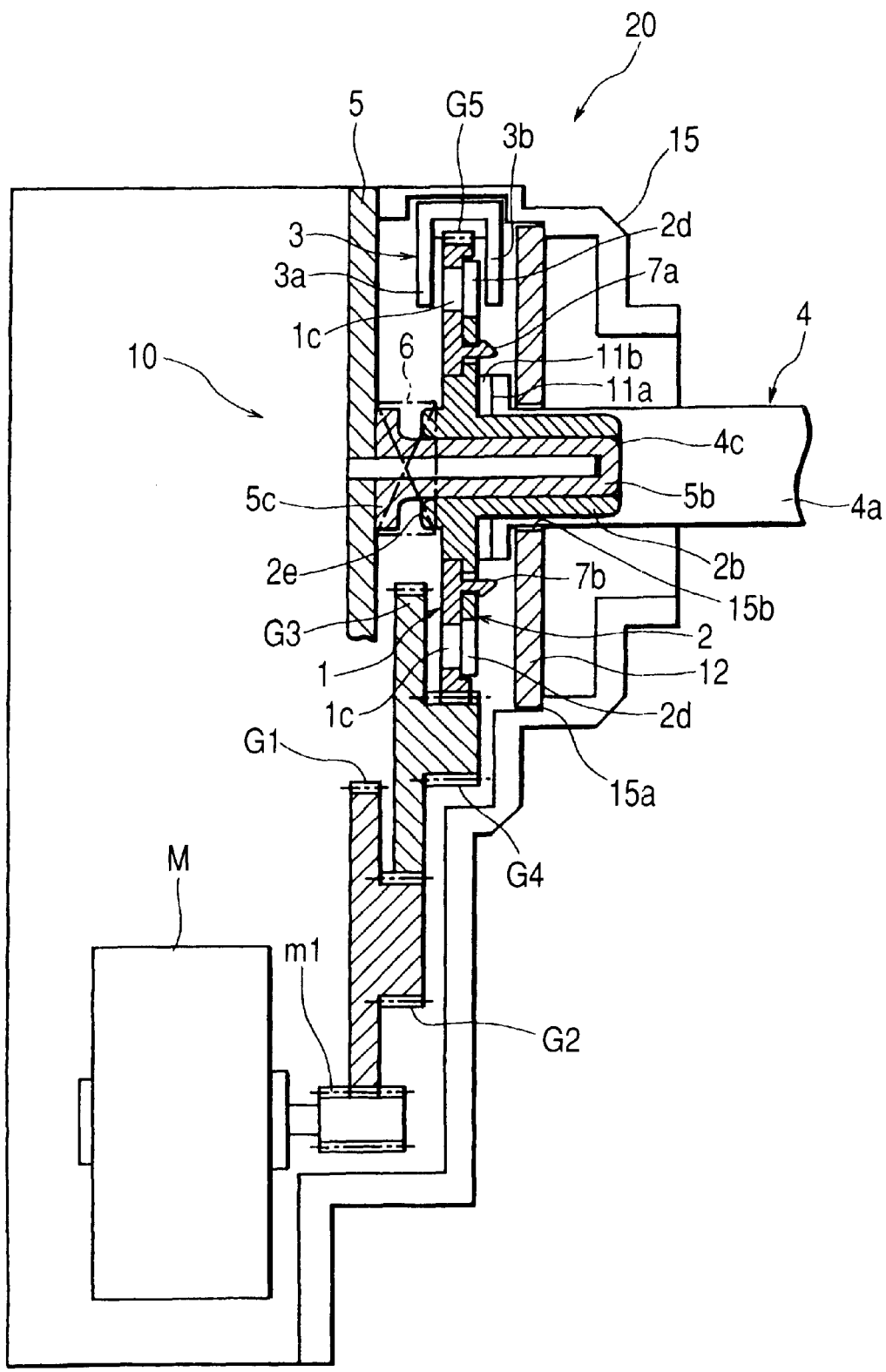
FIG. 2 is a partial sectional view of the assembled rotation detecting apparatus of the present invention housed in a housing.
Figure 4:
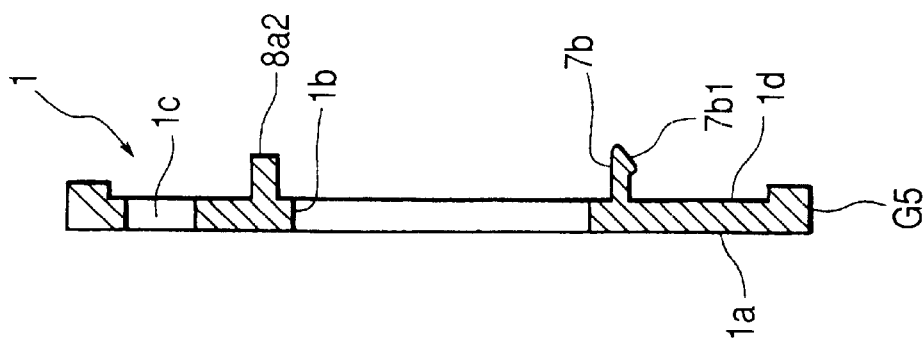
FIG. 4 is a sectional view taken along the line 4—4 of FIG. 3.
Figure 3:
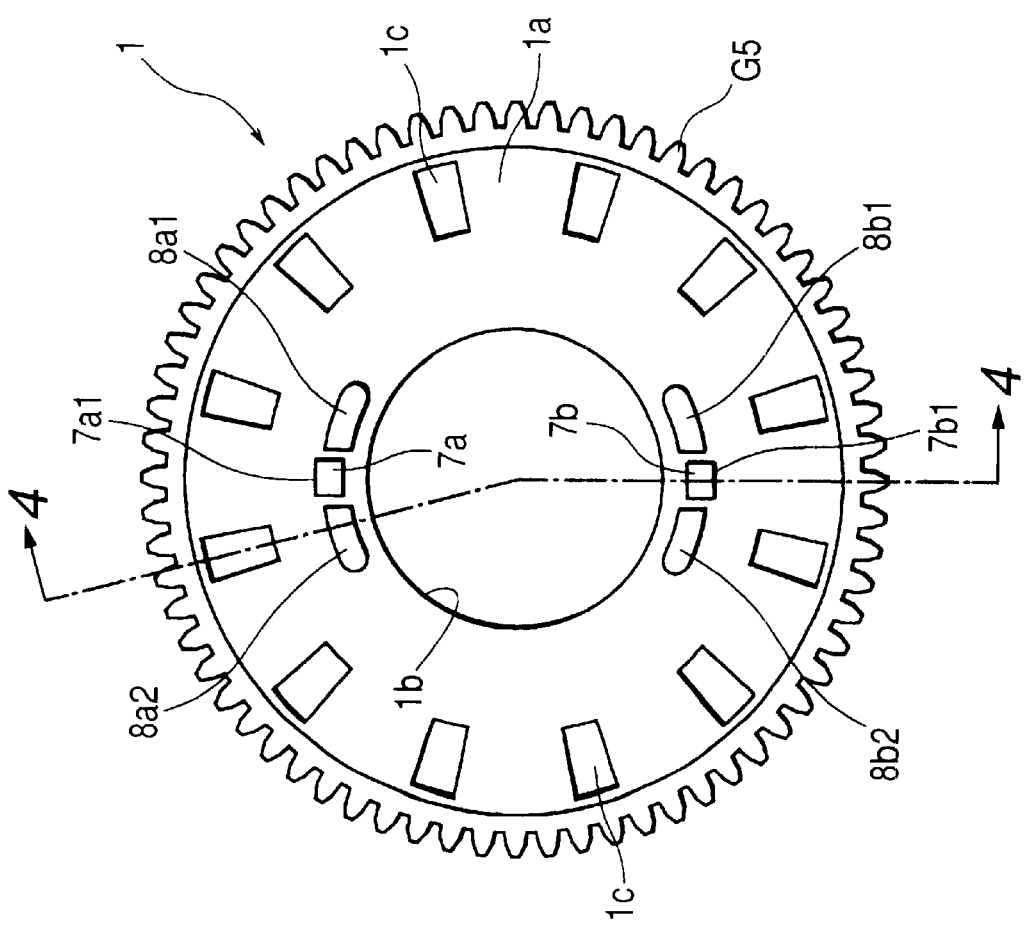
FIG. 3 is a plan view of a first rotating body.
Figure 6:
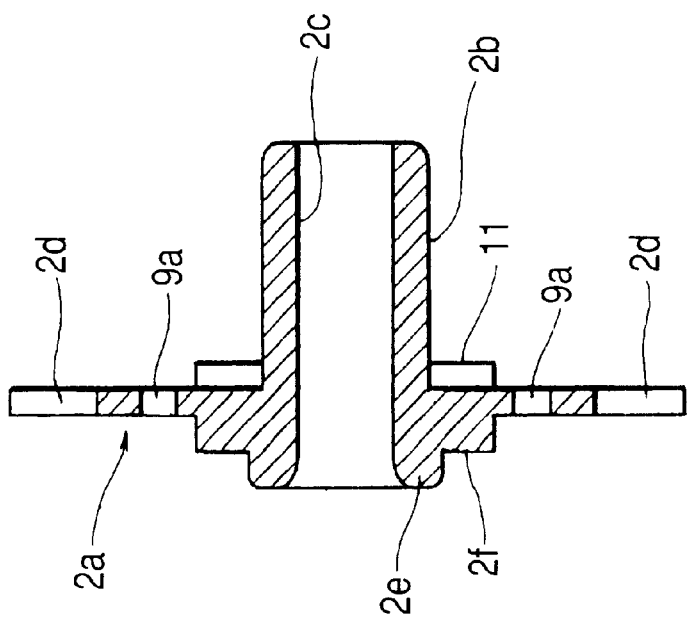
FIG. 6 is a sectional view taken along the line 6—6 of FIG. 5.
Figure 5:
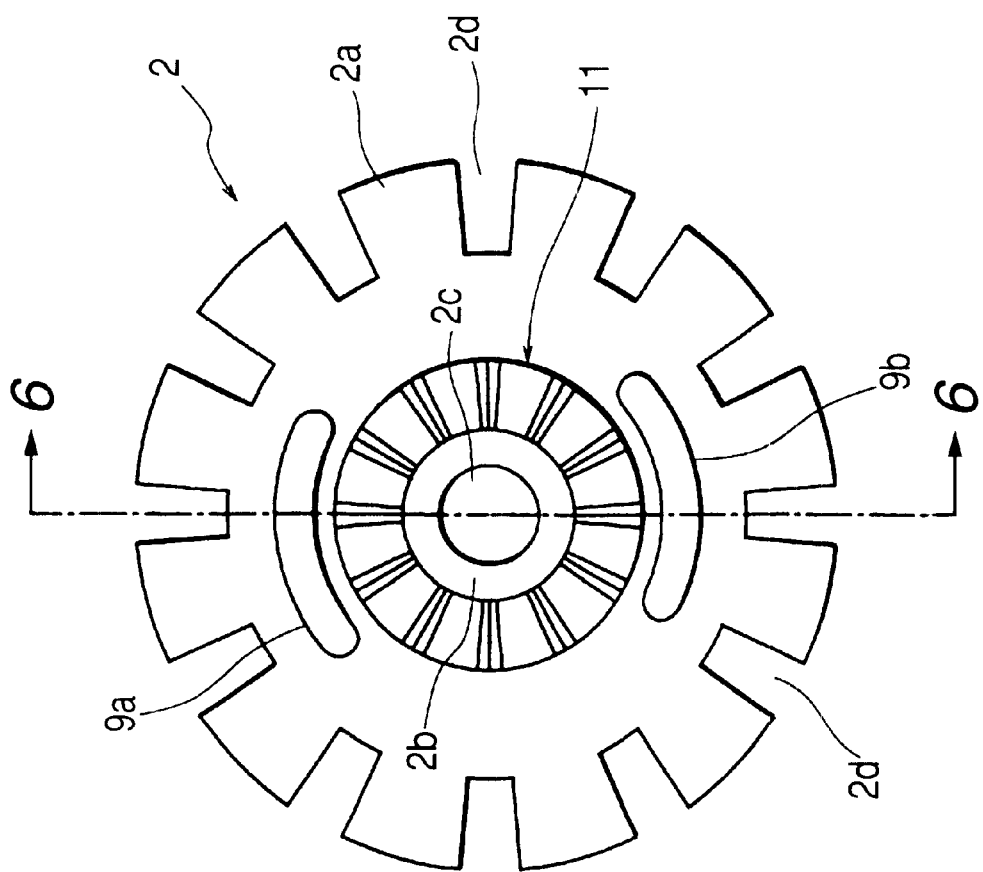
FIG. 5 is a plan view of a second rotating body.
Figure 7:
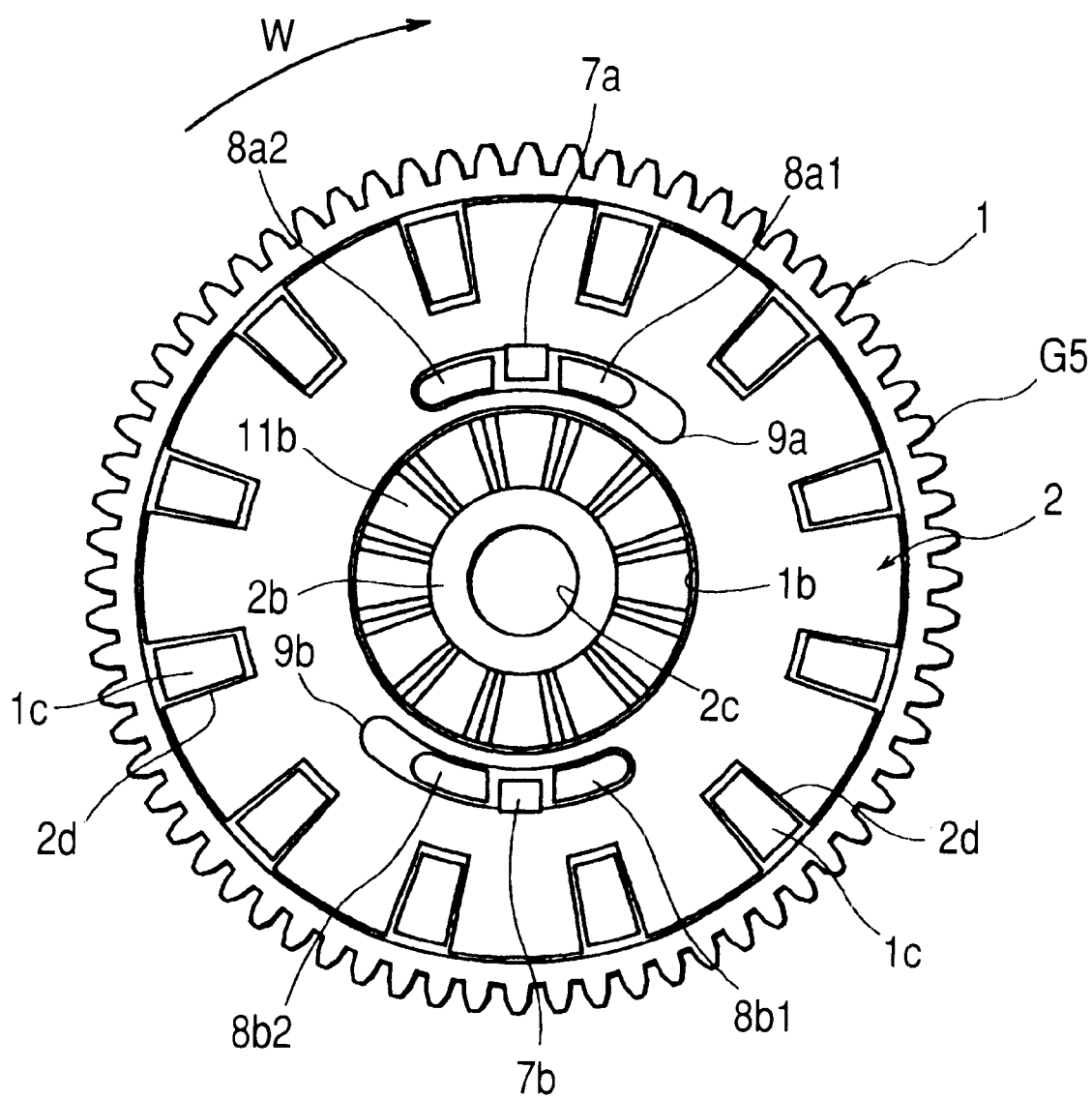
FIG. 7 is an explanatory diagram for explaining the operation of the first rotating body and the second rotating body, showing when light transmission paths are opened.
Figure 8:
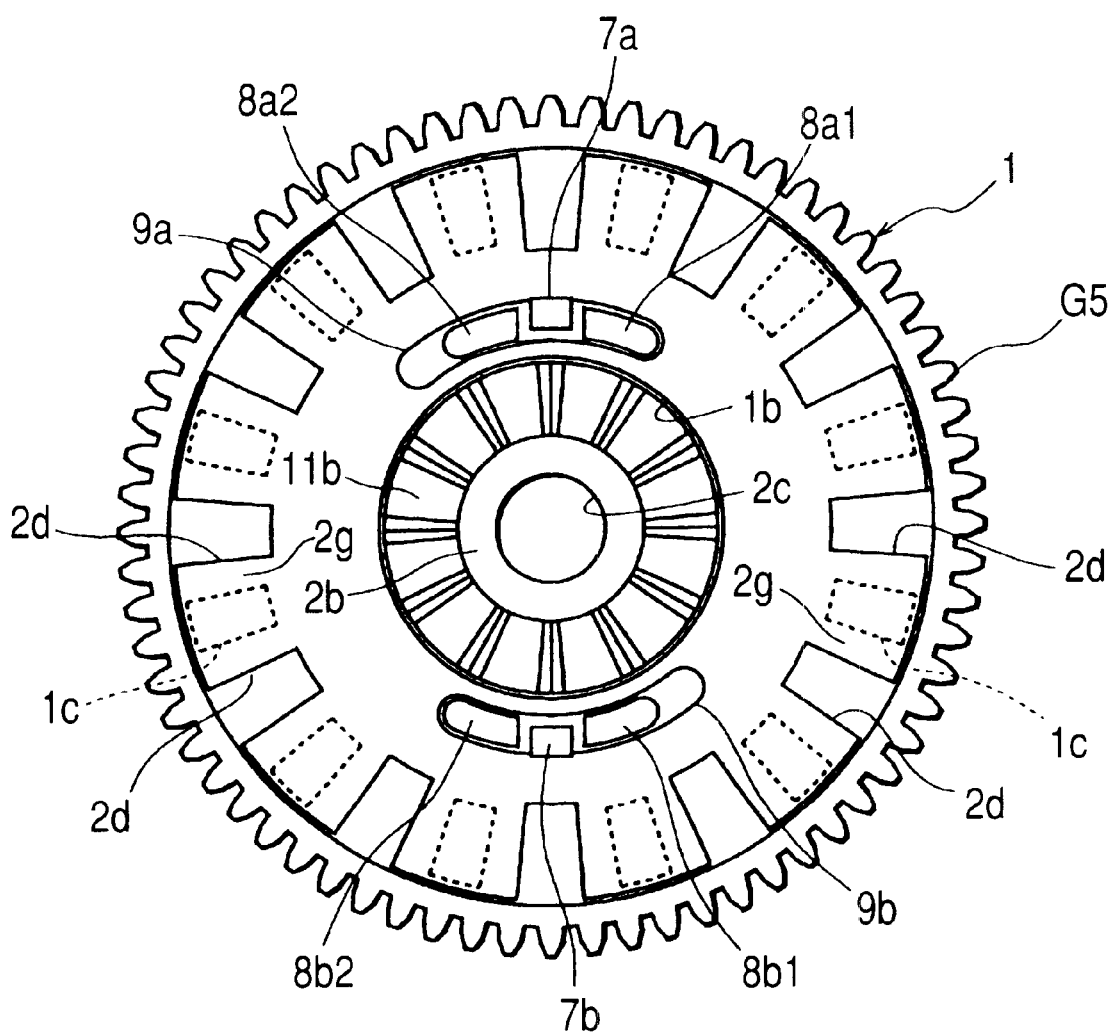
FIG. 8 is an explanatory diagram for explaining the operation of the first rotating body and the second rotating body, showing when the light transmission paths are closed.

Hereinafter, a rotation detecting apparatus of the present invention will be described with reference to the accompanying drawings. FIG. 1 is an exploded perspective view of a rotation detecting apparatus of the present invention. FIG. 2 is a partial sectional view of the assembled rotation detecting apparatus of the present invention housed in a housing. FIG. 3 is a plan view of the first rotating body. FIG. 4 is a sectional view taken along the line 4—4 of FIG. 3. FIG. 5 is a plan view of the second rotating body. FIG. 6 is a sectional view taken along the line 6—6 of FIG. 5. FIGS. 7 and 8 are explanatory diagrams for explaining the operation of the first rotating body and the second rotating body, showing when light transmission paths are opened, and when closed, respectively.

The rotation detecting apparatus 10 shown in FIG. 1 comprises a rotating body (first rotating body) 1, a shutter plate (second rotating body) 2, a sensor 3 as detecting means, a base member 5, and a load member.

The rotating body 1, which comprises a disk 1a made of a resin or the like as shown in FIGS. 1 to 4, has a circular insertion hole 1b formed at the rotation center of the disk 1a. On the periphery of the insertion hole 1b are projectingly formed anchoring projections 7a and 7b and small projections 8a1, 8a2, 8b1, and 8b2 that are perpendicular to one side of the disk 1a. The anchoring projections 7a and 7b are provided in facing relation with each other, the small projections 8a1 and 8a2 are provided at both ends of the anchoring projection 7a, and the small projections 8b1 and 8b2 are provided at both ends of the anchoring projection 7b. The anchoring projection 7a and the small projections 8a1 and 8a2, formed in pairs with the anchoring projection 7b and the small projections 8b1 and 8b2, are formed in facing relation with each other on the periphery of the insertion hole 1b.

The anchoring projections 7a and 7b, as shown in FIGS. 3 and 4, project longer than the small projections 8a1, 8a2, 8b1, and 8b2, and at the tip of the anchoring projections 7a and 7b are formed hooked parts 7a1 and 7b1, respectively. The projecting parts of the hooked parts 7a1 and 7b1 project toward the outer circumference of the rotating body 1. The small projections 8a1, 8a2, 8b1, and 8b2 all are formed curvedly along a cutout curve of the insertion hole 1b.

At the outer circumferential portion of the rotating body 1, as shown in FIGS. 1 to 3, plural light transmission paths 1c penetrating from one side of the disk 1a to another side are radially formed. The light transmission paths 1c all have the same size and are formed at an equal interval.

On one side of the rotating body 1, as shown in FIG. 4, the entirety of the circumferential part of the side on which the anchoring projections 7a and 7b are formed is projectingly formed to define a recessed positioning part 1d.

The shutter plate 2 comprises a discal rotating member 2a made of a resin or the like, and the rotating member 2a is formed to such a size that it can be mounted within the recessed positioning part 1d.

Plural cutout parts (light transmission paths) 2d are radially formed at the circumferential portion of the rotating member 2a. As many cutout parts 2d as the number of the light transmission paths 1c are formed at an equal interval.

Furthermore, a cylindrical shaft projection 2b having a through hole 2c is projectingly formed at the rotation center of the shutter plate 2. On the shutter plate 2, a pair of guide holes 9a and 9b are formed in facing relation across the shaft projection 2b on the periphery of the shaft projection 2b.

The guide holes 9a and 9b are curvedly formed along the rotation direction of the rotating member 2a as shown in FIG. 5. The guide holes 9a and 9b are formed in the position in which the anchoring projections 7a and 7b and the small projections 8a1, 8a2, 8b1, and 8b2 are respectively inserted when the rotating body 1 and the shutter 2 are overlapped.

The shutter plate 2, as shown in FIG. 6, has a projecting member 2e formed projectingly from a side opposite to the above-described side of the rotating member 2a. A positioning rim 2f is formed on the periphery of the projecting member 2e. The positioning rim 2f is formed so that a projection size from the rotating member 2a is smaller than that of the projecting member 2e, and is formed to such a size that it can slide when inserted in the insertion holes 1b formed on the rotating body 1.

The sensor 3 comprises, e.g., a light emitting part 3a consisting of a LED (light emitting diode) and a light receiving part 3b consisting of a PD (photodiode). The sensor 3 is provided at the position in which the light transmission paths 1c are formed, and has the light emitting part 3a disposed at one side of the rotating body 1 and the light receiving part 3b disposed at another side.

The handle 4 comprises a shaft part 4a and an operation part 4b as shown in FIGS. 1 and 2. The shaft part 4a is cylindrical and has a recessed part 4c formed at the tip, and the operation part 4b is provided at the bottom of the shaft part 4a. The shape of the operation part 4b can be changed as required.

The base member 5, comprising a supporting plate 5a and a supporting shaft 5b, has the supporting shaft 5b projectingly disposed at the side of the supporting plate 5a at which the rotating body 1 is provided. A rim 5c is formed on the periphery of the supporting shaft 5b on the supporting plate 5a.

The load member comprises a motor M and a deceleration gear train G. The motor M has a gear m1 provided on the spindle and the gear m1 is coupled with the deceleration gear train G. The deceleration gear train G, which comprises large diameter gears G1 and G3, and small diameter gears G2 and G4, is formed so that the large diameter gear G1 and the small diameter gear G2, and the large diameter gear G3 and the small diameter gear G4 operate integrally, respectively. By the above arrangement, the gear m1 of the motor M is engaged with the large diameter gear G1, and the small diameter gear G4 is engaged with the gear G5. The deceleration ratio of the deceleration gear train G can be appropriately determined by changing, as required, the motor size and the diameters and number of the deceleration gears in accordance with a usage mode.

The rotation detecting apparatus 10 formed as described above is assembled as described below.

That is, the shutter plate 2 is superposed on the rotating body 1. At this time, the anchoring projection 7a and the small projections 8a1 and 8a2 formed on the rotating body 1 are inserted in the guide hole 9a of the shutter 2, and the anchoring projection 7b and the small projections 8b1 and 8b2 are inserted in the guide hole 9b of the shutter 2. Thereby, the shutter plate 2 is securely held in the rotating body 1 by the anchoring projections 7a and 7b.

In this case, when the anchoring projections 7a and 7b have been inserted in the guide holds 9a and 9b, the hooked parts 7a1 and 7b1 at the tip of the anchoring projections 7a and 7b are abutted against the opening edges of the guide holes 9a and 9b, and the anchoring projections 7a and 7b are inserted in the guide holes 9a and 9b while deforming elastically inward somewhat. When the hooked parts 7a1 and 7b1 have projected beyond the guide holes 9a and 9b, respectively, the anchoring projections 7a and 7b each return elastically so that the hooked parts 7a1 and 7b1 are anchored to the edges of the guide holes 9a and 9b of the shutter plate 2.

The shutter plate 2 is mounted within the recessed positioning part 1d to prevent it from joggling in the rotating body 1.

The guide holes 9a and 9b are formed extendedly in slide direction so that the anchoring projections 7a and 7b, and the small projections 8a1, 8a2, 8b1, and 8b2 can rotate slidingly within the guide holes 9a and 9b within a predetermined allowance angle range when having been inserted in them.

Furthermore, the shutter plate 2 is provided with a handle 4. The shaft projection 2b is inserted in the recessed part 4c of the handle 4 so that it can rotate.

After the above-described rotating body 1 has been combined with the shutter plate 2, the sensor 3, and the handle 4, it is set in the supporting shaft 5b of the base member 5. At this time, the coil spring 6 is set in the supporting shaft 5b, the insertion hole 1b of the rotating body 1 is fitted in the supporting shaft 5b, and the through hole 2c of the shutter plate 2 is inserted. Thereby, the rotating body 1, the shutter plate 2, and the handle 4 are rotatably supported on the base member 5. The coil spring 6 is positioned by the rim 5c formed at the bottom of the supporting shaft 5b and the projecting member 2e of the shutter plate 2.

Furthermore, the rotating body is provided with the motor M and the deceleration gear train G. That is, the motor M has the gear m1 provided on the spindle, the gear m1 is engaged with the large diameter gear G1, the small diameter gear G2 is engaged with the large diameter gear G3, and the small diameter gear G4 is engaged with the gear G5 formed on the rotating body 1. Use of the deceleration gear train G enables motors having small driving force to produce a large load.

A rotation detecting apparatus 10 assembled in this way, where it is used for, e.g., fishing game software as shown in FIG. 2, is housed in a housing 15 simulating a reel and can be used as a game controller 20.

In the controller 20, when the rotation detecting apparatus 10 is housed in the housing 15, as shown in FIG. 2, a dropout prevention plate 12 is provided to ensure that the rotation detecting apparatus 10 is held within the housing 15.

An insertion hole 15b in which the handle 4 can be inserted is formed on the dropout prevention plate 12, and the handle 4 is inserted in the insertion hole 15b. The edge of the dropout prevention plate 12 is anchored to the anchoring part 15a formed on the inside wall of the housing 15, and the tip of the shaft part 4a of the handle 4 is anchored to the circumferential part of the insertion hole 15b, thereby preventing the rotating body 1, the shutter plate 2, and the handle 4 from coming off the housing 15.

Although not shown, the deceleration gear train G is rotatably supported by a rotating shaft provided at a predetermined position within the housing 15 and the motor M is fixed at a proper position within the housing 15.

The rotation detecting apparatus 10 is provided with a unidirectionally rotating clutch (reverse rotation preventing clutch) for preventing the handle 4 from rotating reversely when the handle 4 is rotated in the opposite direction. The clutch is provided with a driving part 11a at the tip of the shaft part 4a and a driven part 11b at a side opposite to the tip, of the bottom of the shaft projection 2b. As shown in FIG. 2, the coil spring 6 is inserted in the supporting shaft 5b between the supporting plate 5 and the shutter plate 2 so that the driving part 11a and the driven part 11b press each other to function as a clutch.

With this construction, when the handle 4 is rotated in the rotation input direction (W direction shown in FIG. 1), the rotating body 1 is rotated in the forward direction, while, when the handle 4 is rotated in the direction opposite to the above-described direction, the rotating body 1 is prevented from rotating in the opposite direction. The shape in which the driving part 11a and the driven part 11b are engaged with each other in facing relation may be a conventional shape having been commonly used.

When the handle 4 is rotated in the forward direction (W direction), the driving part 11a and the driven part 11b are engaged with each other so that the shutter plate 2 and the rotating body 1 are rotated along with the handle 4. At this time, if a coil of the motor M is short-circuited, rotation resistance force occurs in the rotating body of the motor M and a rotation load is given to the handle 4. If the motor M is energized so as to trigger rotation in a direction opposite to the forward direction, a rotation force in the direction opposite to the forward direction is given to the handle 4. The resistance forces and reverse rotation force are carried out by feedback control from the game software. If rotation input is broken when the handle 4 is being rotated in the forward direction, the rotation of the handle is stopped, but the rotating body 1 undergoes the inertia force of the rotor of the motor M. The inertia force is large particularly when the coil of the motor M is not short-circuited and the motor M is not energized for rotation in the opposite direction.

Next, the rotation detection operation of the rotation detecting apparatus 10 will be described with reference to FIGS. 7 and 8.

In the rotation detecting apparatus 10, if the handle 4 is rotated in the rotation input direction (W direction), the shutter plate 2 is rotated in the W direction (forward direction) shown in FIG. 7. In this case, the anchoring projection 7a and the small projections 8a1 and 8a2 slide guided to the guide hole 9a and are slid until the small projection 8a2 abuts one end of the guide hole 9a that is opposite to the rotation direction. In the same way, the anchoring projection 7b and the small projections 8b1 and 8b2 slide guided to the guide hole 9b and are slid until the small projection 8b1 abuts one end of the guide hole 9b that is opposite to the rotation direction. By the above-described slide operation, the guide holes 9a and 9b are rotated in the W direction while pressing the small projections 8a2 and 8b1. The anchoring projections 7a and 7b are engaged in the shutter plate 2 by the hooked parts 7a1 and 7b1 at their tips, whereby the rotating body 1 and the shutter 2 are slid without disengaging from each other.

When the handle 4 is being rotated in the W direction, all of the light transmission paths 1c of the rotating body 1 and the cutout parts 2d of the shutter plate 2 overlap one another so that penetration is achieved between one side and another side of the rotating body 1. Consequently, light issued from the light emitting part (LED, etc.) 3a of the sensor 3 passes through penetration holes formed by the light transmission paths 1c and the cutout parts 2d and is received in the light receiving part 3b.

Upon the break of rotation input in the rotation input direction of the handle 4, when the rotating body 1 attempts to continue to rotate in the W direction by rotation force (rotation resistance force) when the motor M is short-circuited, or by the inertia force of the rotor of the motor M when the motor M is not short-circuited, the rotation of the shutter plate 2 is stopped, but the rotating body 1 continues to rotate. As a result, as shown in FIG. 8, the shutter plate 2 is rotated relatively in the direction opposite to the rotation direction of the rotating body 1. At this time, the anchoring projection 7a and the small projections 8a1 and 8a2 are guided to the guide hole 9a and slid in the direction opposite to the above-described direction until the small projection 8a1 abuts another end of the guide hole 9a. The anchoring projection 7b and the small projections 8b1 and 8b2 are guided to the guide hole 9b and slid in the direction opposite to the above-described direction until the small projection 8b2 abuts another end of the guide hole 9b.

By the above-described slide operation, the small projections 8a1 and 8b2 are pressed by the guide holes 9a and 9b, respectively. Thereby, the light transmission paths 1c of the rotating body 1 overlaps none of the cutout parts 2d of the shutter plate 2 and the light transmission paths 1c are closed by non-cutout parts 2g between the cutout parts 2d and adjacent cutout parts 2d. Consequently, light issued by the light emitting part 3a is closed by the non-cutout parts 2g of the shutter plate 2, so that light is not received in the light receiving part 3b and no rotation signal (light detecting signal) is outputted.

The rotation detecting apparatus 10 of the present invention is not limited to those equipped with the above-described clutch of unidirectional rotation type, and may apply to rotation detecting apparatuses capable of bidirectional rotation that are not equipped with a clutch of unidirectional rotation type.

The above-described rotation detecting apparatus capable of bidirectional rotation is described with reference to the rotation detecting apparatus 10 shown in FIG. 1. The above-described rotation detecting apparatus can be achieved by deleting the driving part 11a of the handle 4 and the driven part 11b of the shutter plate 2 so that the handle 4 is directly coupled to the shutter plate 2. In other points, the above-described rotation detecting apparatus has the same configuration as the rotation detecting apparatus 10. Load means comprising the motor M and the deceleration gear train G can be provided in the case where there is a need to afford load, and can be mounted only where the circuit is not damaged when the handle 4 is reversely rotated.

The detection operation of a rotation detecting apparatus of the above type is the same as that of the rotation detecting apparatus 10. That is, when the handle 4 is rotated in the rotation input direction, rotation force is transmitted to the shutter plate 2 as shown in FIG. 7, and the anchoring projection 7a, and the small projections 8a1 and 8a2 of the rotating body 1 rotate slidingly within the guide hole 9a and abut one end of the guide hole 9a. Also, the anchoring projection 7b, and the small projections 8b1 and 8b2 rotate slidingly within the guide hole 9b and abut one end of the guide hole 9b. At this time, the small projection 8a2 is pressed against one end of the guide hole 9a and the small projection 8b1 is pressed against the guide hole 9b, whereby the rotating body 1 is rotated. Thereby, the light transmission paths 1c of the rotating body 1 are overlapped with the cutout parts 2d of the shutter plate 2 and light can be transmitted from the light emitting part 3a to the light receiving part 3b, so that a rotation signal (light detection signal) of the handle 4 is outputted.

When the handle 4 is rotated in a direction opposite to the above-described direction, rotation force of the opposite direction is transmitted from the handle 4 to the shutter plate 2. At this time, as shown in FIG. 8, the rotation of the shutter plate 2 causes the anchoring projection 7a and the small projections 8a1 and 8a2 to slide within the guide hole 9a until they abut the other end of the guide hole 9a, and the anchoring projection 7b and the small projections 8b1 and 8b2 to slide within the guide hole 9b until they abut the other end of the guide hole 9b. By the above slide operation, the rotating body 1 and the shutter plate 2 are rotated in opposite directions with respect to each other, so that any of the plural light transmission paths 1c formed on the rotating body 1 is closed by the non-cutout part 2g formed between adjacent cutout parts 2d of the shutter plate 2. Consequently, light issued from LED of the light emitting part 3 of the sensor, cannot be detected in the light receiving part 3b, so that a rotation signal of the handle 4 is not detected.

A variant of a rotation detecting apparatus of the present invention is described with reference to FIG. 9.

Figure 9:
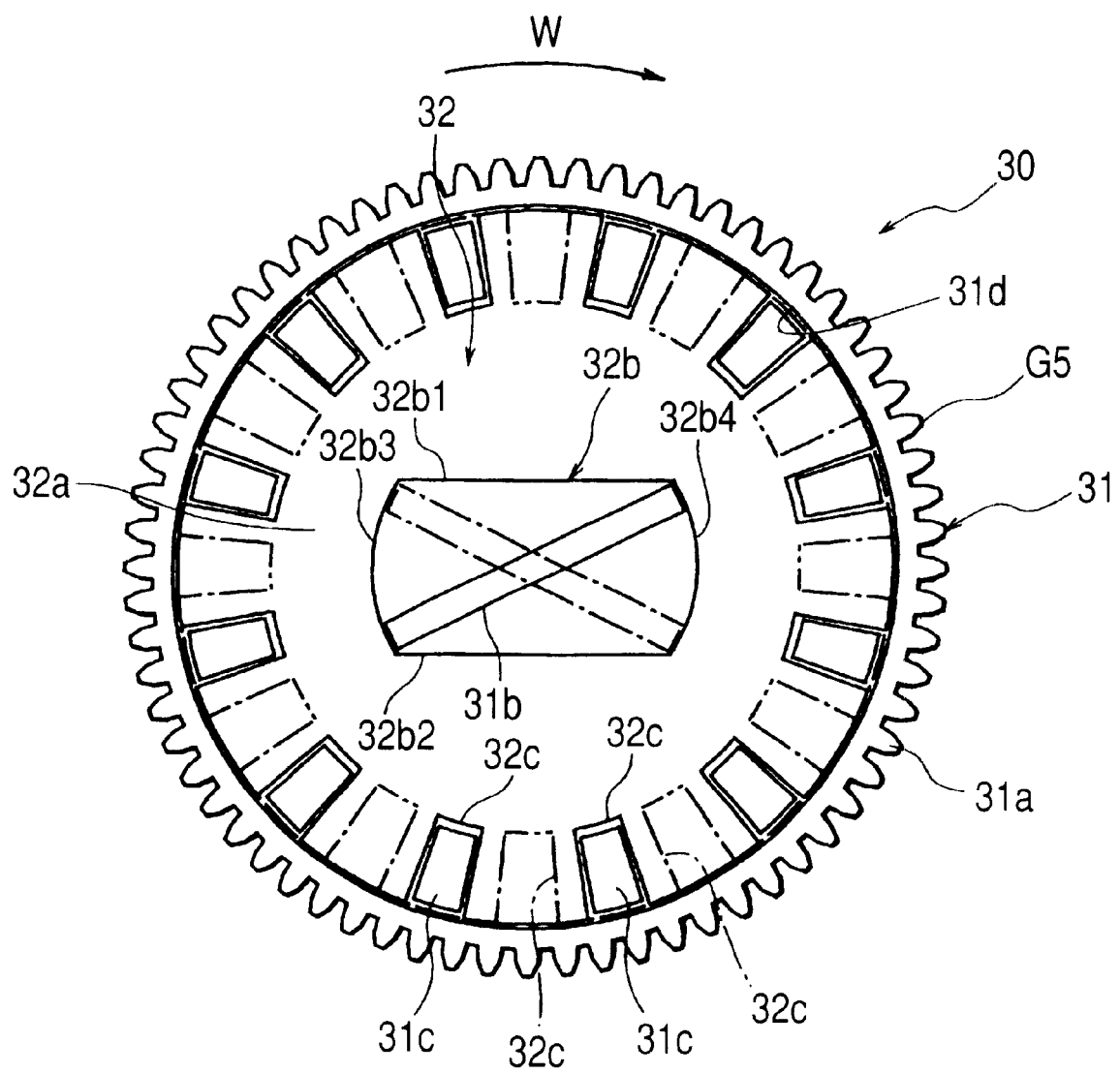
FIG. 9 is an explanatory diagram for explaining a variant of the rotation detecting apparatus of the present invention.
Figure 10:
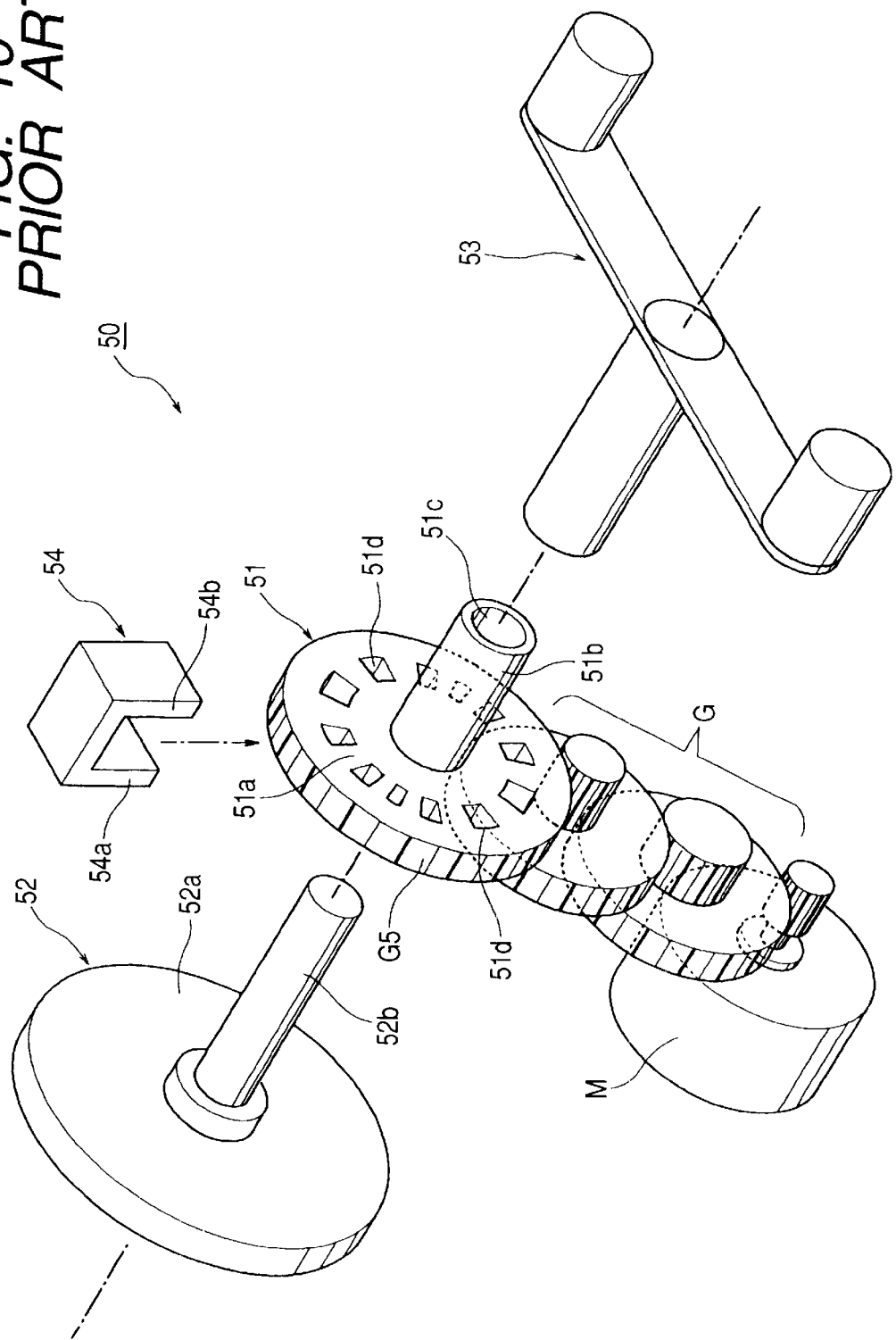
FIG. 10 is an exploded perspective view showing a conventional optical rotation detecting apparatus.

A rotation detecting apparatus shown in FIG. 9 has a rotating body (first rotating body) 31 and a shutter plate (second rotating body) 32.

The rotating body 31 comprises a disk 31a, on one side of which a long rectangular anchoring projection 31b extending radially through the rotation center of the disk 31a is projectingly formed. Light transmission paths 31c, gear G5, and recessed parts 31d are formed like those of the rotating body 1.

The shutter plate 32 comprises a circular rotating member 32a, at the portion containing the rotation center of which a substantially rectangular guide hole 32b is formed. The guide hole 32b is formed by lines 32b1 and 32b2 at one facing portion and by curves 32b3 and 32b4 at the other facing portion. Cutout parts 32c are formed like the cutout parts 2d of the shutter plate 2.

A handle, a base member, or other components may be mounted, deformed as required.

The rotation detecting apparatus 30 is provided with a shutter plate 32 at one side of the rotating body 31, and the anchoring projection 31b is inserted in the guide hole 32b of the shutter plate 32. In this case, the anchoring projection 31b is disposed so that it contacts the curves 32b3 and 32b4 at both ends, and the shutter plate 32 is rotatably supported on the rotating body 31. A dropout prevention member or the like are provided as required.

In the rotation detecting apparatus 30, a portion corresponding to the above-described handle 4 is provided at the side of the shutter plate 32, and a base member corresponding to the base member 5 is provided at the side distant from the handle 4. A clutch, a load member, or the like may be or may not be provided according to a usage mode.

Next, the detection operation of the rotation detecting apparatus 30 is described.

When the handle is rotated in the rotation input direction (W direction), the shutter 32 is rotated in the W direction. At this time, one end of the anchoring projection 31b (portion indicated by the solid line) is anchored at the corner of the line 32b2 side of the curve 32b3, and another end is anchored at the corner of the line 32b1 side of the curve 32b4. Thereby, the light transmission paths 31c of the rotating body 31 and the cutout parts 32c of the shutter plate 32 overlap one another, so that a light detection signal is outputted in the sensor.

When rotation input in the rotation input direction of the handle is broken and the rotating body 31 is rotated by inertia force, or when rotation input is made in the backward direction (direction opposite to the W direction), the shutter plate 32 is rotated in a direction opposite to the rotation input direction, and the rotating body 31 and the shutter plate 32 are relatively rotated in opposite directions. At this time, the anchoring projection 31b, as indicated by the dashed line of FIG. 9, is rotated in such a way that one end thereof slides along the curve 32b3 until it reaches the corner of the line 32b1 side of the curve 32b3 and another end thereof slides along the curve 32b4 until it reaches the corner of the line 32b2 side of the curve 32b4, and is anchored therein. As a result, any of the light transmission paths 31c is closed by a non-cutout part between adjacent cutout parts 32c, so that no light detection signal is outputted.

The rotation detecting apparatuses 10 and 30 of the present invention are not limited to the shapes described in the above-described embodiments. The number of light transmission paths, pitches, and the like can be changed as required.

According to the present invention, even if rotation input is broken during handle rotation operation and a rotating body continues to rotate by the rotation force of a motor or the inertia force of a rotor of the motor, a shutter plate is relatively rotated in a direction opposite to the rotation direction of the rotating body, whereby the light transmission paths of the rotating body are immediately closed by the shutter plate. By this arrangement, invalid detection that a rotation signal is detected when handle operation is stopped is prevented.

Even if the rotation detecting apparatuses are provided with a handle capable of rotation operation in the opposite direction, invalid detection can be prevented by ignoring rotation input in the opposite direction.

What is claimed is:

1. A rotation detecting apparatus, comprising:
    a first rotating body;
    a second rotating body serving as an input side of rotation force that rotates along with the first rotating body;
    light transmission paths formed on both the first rotating body and the second rotating body; and
    detecting means for detecting light passing through both the light transmission paths of the first rotating body and those of the second rotating body, wherein the first rotating body and the second rotating body can rotate relatively within a predetermined allowance angle range;
    wherein, when rotation force is inputted to the second rotating body, and the second rotating body and the first rotating body are rotating together in a rotation input direction, the light transmission paths of the first rotating body and those of the second rotating body overlap one another and light can be detected by the detecting means; and wherein, when input of the rotation force to the second rotating body is broken and the first rotating body continues to rotate by inertia force in the rotation input direction, the second rotating body rotates relative to the first rotating body in a direction opposite to the rotation direction of the first rotating body within the allowance angle range, the light transmission paths of the first rotating body and those of the second rotating body deviate in position from each other, and the light to the detecting means is cut off.

2. The rotation detecting apparatus according to claim 1, wherein a load to exert the inertia force is connected to the first rotating body.

3. The rotation detecting apparatus according to claim 2,
wherein a motor to apply rotation force to the first rotating body is provided to apply rotation resistance to the first rotating body or rotation force in a direction opposite to the rotation direction of rotation force inputted to the second rotating body, and when the motor does not exert the rotation resistance force or the rotation force of the opposite direction, inertial force is applied to the first rotating body by a weight of a rotor of the motor.

4. The rotation detecting apparatus according to claim 1, wherein a handle to apply rotation force to the second rotating body is provided, and when the first rotating body and the second rotating body rotate together and light passing through the light transmission paths is detected by the detecting means, control input to game software is made by a light detection signal from the detecting means that changes in accordance with the rotation speeds of the first rotating body and the second rotating body.

5. A rotation detecting apparatus, comprising:

a first rotating body;

a second rotating body serving as an input side of rotation force that rotates along with the first rotating body;

light transmission paths formed on both the first rotating body and the second rotating body; and detecting means for detecting light passing through both the light transmission paths of the first rotating body and those of the second rotating body, wherein the first rotating body and the second rotating body can rotate relatively within a predetermined allowance angle range;

wherein, when rotation force is inputted to the second rotating body, and the second rotating body and the first rotating body are rotating together in a rotation input direction, the light transmission paths of the first rotating body and those of the second rotating body overlap one another and light can be detected by the detecting means; and wherein, when rotation force in a direction opposite to the input direction is applied to the second rotating body and the second rotating body rotates relative to the first rotating body in a direction opposite to the rotation direction of the first rotating body within the allowance angle range, the light transmission paths of the first rotating body and those of the second rotating body deviate in position from each other, and the light to the detecting means is cut off.

6. The rotation detecting apparatus according to claim 5, wherein a handle to apply rotation force to the second rotating body is provided, and when the first rotating body and the second rotating body rotate together and light passing through the light transmission paths is detected by the detecting means, control input to game software is made by a light detection signal from the detecting means that changes in accordance with the rotation speeds of the first rotating body and the second rotating body.

* * * * *